United States Patent
Kanekawa et al.

(10) Patent No.: US 12,386,359 B2
(45) Date of Patent: Aug. 12, 2025

(54) SAFETY CONTROL DEVICE AND SAFETY RULE ADJUSTMENT METHOD

(71) Applicant: Hitachi, Ltd., Tokyo (JP)

(72) Inventors: Nobuyasu Kanekawa, Tokyo (JP); Junya Takahashi, Tokyo (JP); Satoshi Otsuka, Tokyo (JP); Hiroyuki Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 218 days.

(21) Appl. No.: 18/271,527

(22) PCT Filed: Nov. 2, 2021

(86) PCT No.: PCT/JP2021/040469
§ 371 (c)(1),
(2) Date: Jul. 10, 2023

(87) PCT Pub. No.: WO2022/158081
PCT Pub. Date: Jul. 28, 2022

(65) Prior Publication Data
US 2024/0053766 A1     Feb. 15, 2024

(30) Foreign Application Priority Data
Jan. 19, 2021 (JP) .................. 2021-006238

(51) Int. Cl.
*G05D 1/02* (2020.01)
*B60L 3/00* (2019.01)
(Continued)

(52) U.S. Cl.
CPC .......... *G05D 1/0289* (2013.01); *B60L 3/0015* (2013.01); *B60L 15/40* (2013.01);
(Continued)

(58) Field of Classification Search
CPC ...... G05D 1/0289; G05D 1/249; G05D 1/617; G05D 1/693; G05D 1/6987;
(Continued)

(56) References Cited

U.S. PATENT DOCUMENTS 9,894,101 B2    2/2018  Hendrick et al.
2007/0142996 A1  6/2007  Lee et al.
(Continued)

FOREIGN PATENT DOCUMENTS

JP    2007-161225 A    6/2007
JP    2013-028423 A    2/2013
(Continued)

OTHER PUBLICATIONS

International Search Report of PCT/JP2021/040469 dated Jan. 25, 2022.
(Continued)

*Primary Examiner* — Rodney A Butler
(74) *Attorney, Agent, or Firm* — MATTINGLY & MALUR, PC

(57) ABSTRACT

The problem of ensuring safety and work efficiency for the actions of a control target is addressed in an environment in which different types of control systems coexist. A safety control server controls the actions of respective control targets in differing systems and includes an action adjustment unit that, for each control target of differing control systems, outputs to a control target an action adjustment instruction for adjusting the action of that control target when a contention occurs in which the action of that control target deviates from an assumed control result. An action plan adjustment unit, when the adjustment of the action satisfies a prescribed condition, adjusts an action plan indicating an action rule for achieving a function and avoiding a contention in a control target; and a safety rule adjustment (Continued)

unit adjusts a safety rule indicating an action rule for avoiding a contention in the control target.

8 Claims, 17 Drawing Sheets

(51) Int. Cl.
| | | |
|---|---|---|
| *B60L 15/40* | (2006.01) | |
| *B61L 27/20* | (2022.01) | |
| *G05D 1/00* | (2006.01) | |
| *G06Q 10/08* | (2024.01) | |
| *G06Q 50/04* | (2012.01) | |
| *G06Q 50/06* | (2012.01) | |

(52) U.S. Cl.
CPC .............. *B61L 27/20* (2022.01); *G06Q 10/08* (2013.01); *G06Q 50/04* (2013.01); *G06Q 50/06* (2013.01)

(58) Field of Classification Search
CPC ........... G05D 2105/28; G05D 2107/70; G05D 2109/10; B60L 3/0015; B60L 2240/622; B60L 2240/68; B60L 2240/70; B60L 15/40; B60L 3/12; G08G 1/164; G06Q 10/063; G06Q 10/08; G06Q 50/04; G06Q 50/06; G06Q 50/08; G06Q 50/265; B61L 27/20; G05B 9/02
See application file for complete search history.

(56) References Cited

U.S. PATENT DOCUMENTS

| | | |
|---|---|---|
| 2019/0381661 A1 | 12/2019 | Taira et al. |
| 2022/0021299 A1 | 1/2022 | Miyazaki et al. |

FOREIGN PATENT DOCUMENTS

| | | |
|---|---|---|
| JP | 2019-016104 A | 1/2019 |
| JP | 2020-096517 A | 6/2020 |
| WO | 2015/132938 A1 | 9/2015 |

OTHER PUBLICATIONS

Extended European Search Report received in corresponding European Application No. 21921184.4 dated Dec. 19, 2024.
Truong, N. B. et al., "Software Defined Networking-based Vehicular Adhoc Network with Fog Computing", IFIP/IEEE IM 2015 Workshop: 7th International Workshop on Management of the Future Internet (ManFI), 2015, pp. 1202-1207.

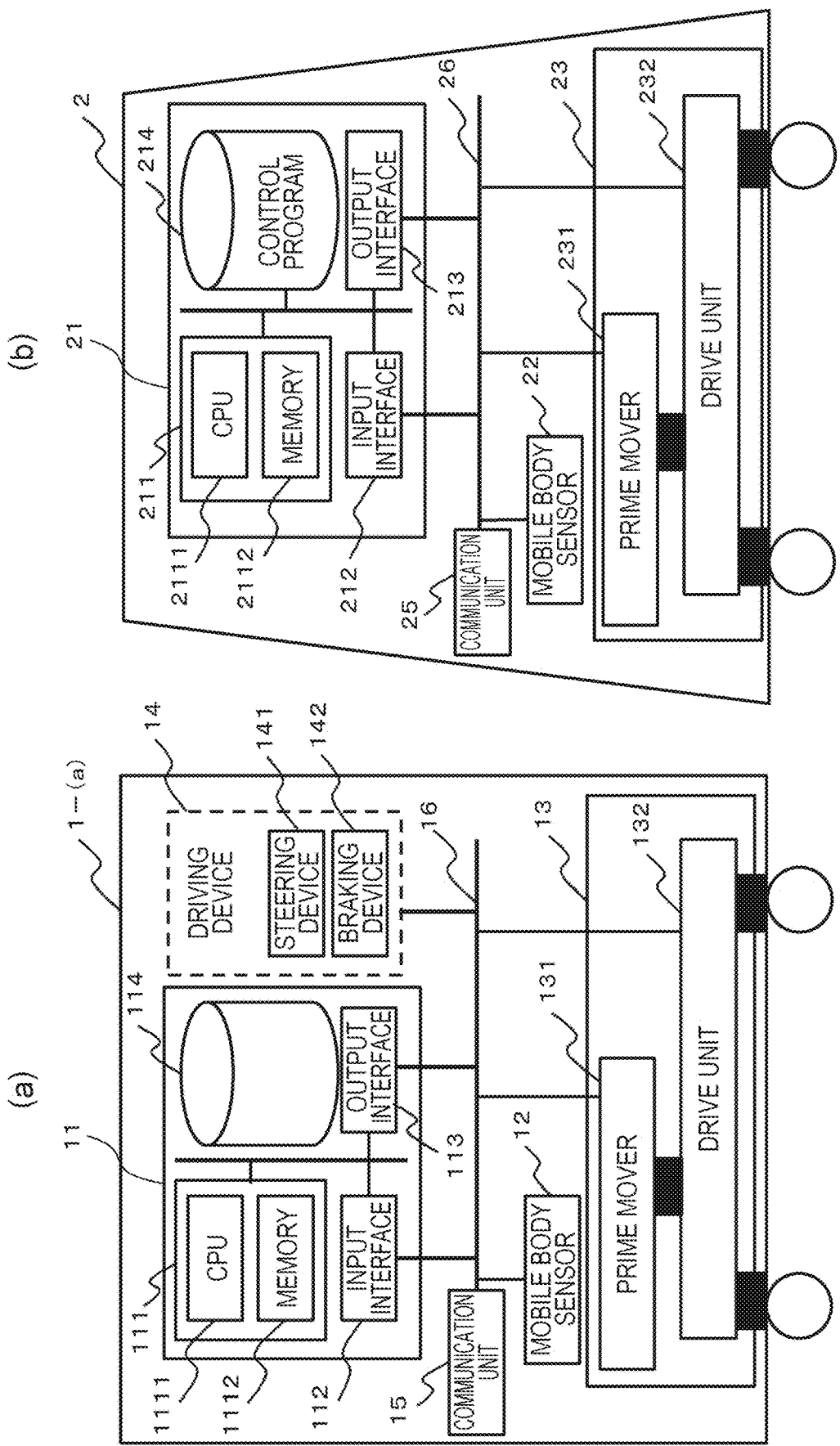

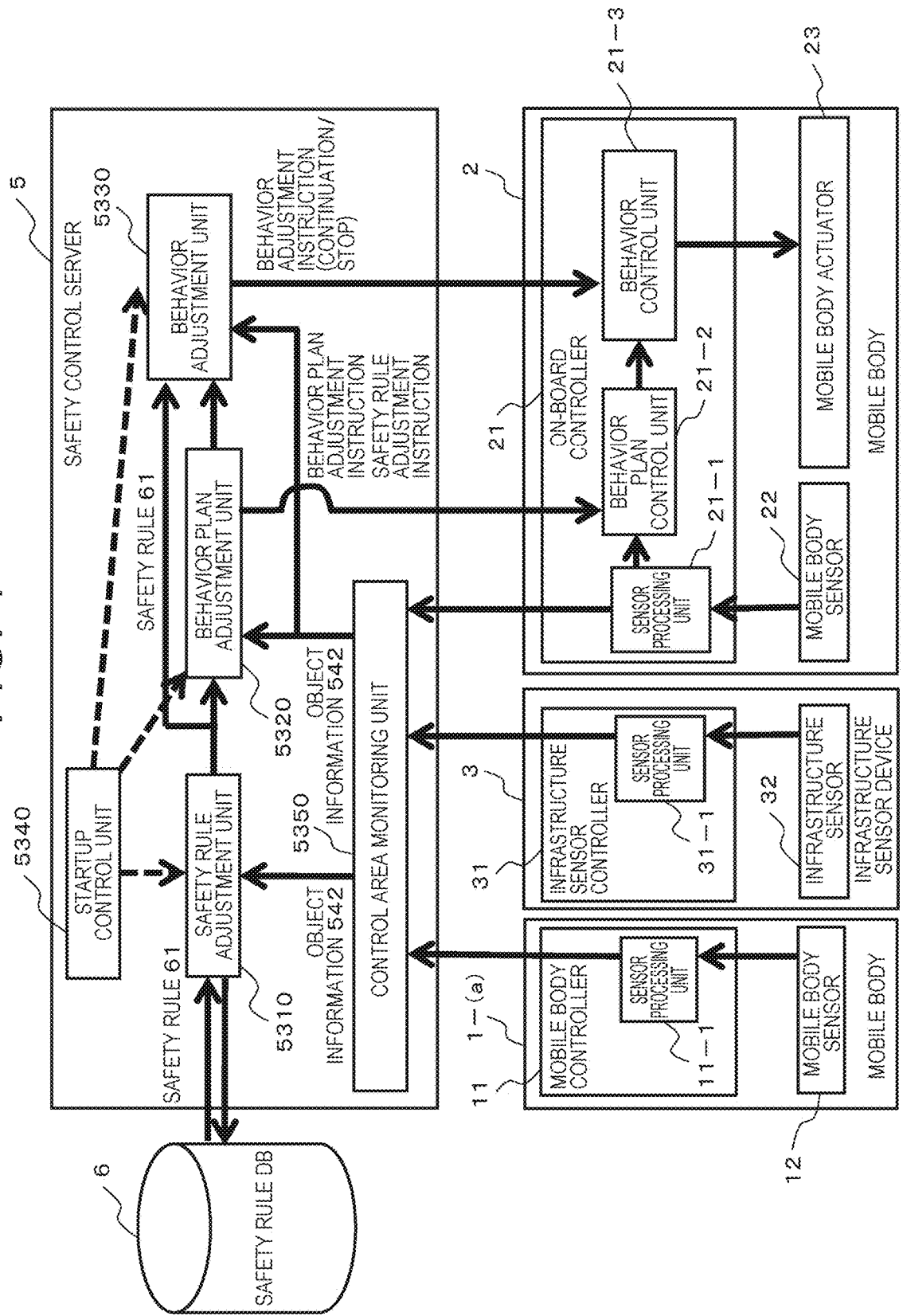

| SAFETY RULE ID | INTERDICTION CONDITION | | | BEHAVIOR |
|---|---|---|---|---|
| | STARTING TIME (ELAPSED TIME) | ENVIRONMENT CONDITION | IMMEDIATELY PRECEDING BEHAVIOR | |
| 00001 | 10min | 3m OR LESS | ACCELERATION/ STEERING | STOP |
| .... | .... | .... | .... | .... |

| SAFETY RULE ID | PERMISSION CONDITION | | | BEHAVIOR |
|---|---|---|---|---|
| | STARTING TIME (ELAPSED TIME) | ENVIRONMENT CONDITION | IMMEDIATELY PRECEDING BEHAVIOR | |
| 00001 | 10min | 3m OR MORE | ACCELERATION/ STEERING | ACCELERATION |
| .... | .... | .... | .... | .... |

| BEHAVIOR PLAN ID | BEHAVIOR STARTING CONDITION | | | BEHAVIOR ENDING CONDITION | BEHAVIOR |
|---|---|---|---|---|---|
| | STARTING TIME (ELAPSED TIME) | ENVIRONMENT CONDITION | IMMEDIATELY PRECEDING BEHAVIOR | ENDING TIME (ELAPSED TIME) | |
| 00011 | 10min | 3m OR MORE | ACCELERATION/ STEERING | 20min | ACCELERATION, CONSTANT SPEED TRAVEL |
| .... | .... | .... | .... | .... | .... |

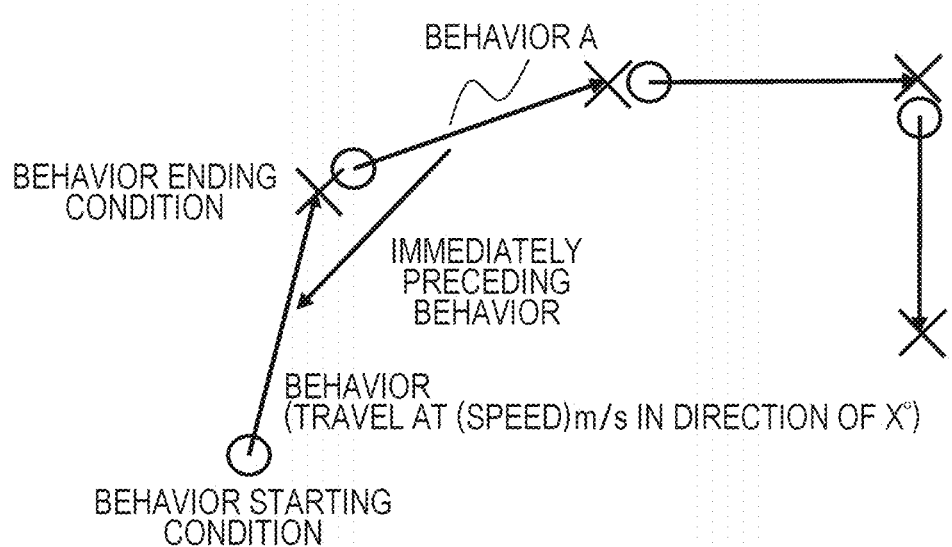

| PRIORITY | BEHAVIOR PLAN ID | BEHAVIOR STARTING CONDITION ||| BEHAVIOR ENDING CONDITION | BEHAVIOR |
| --- | --- | --- | --- | --- | --- | --- |
| | | STARTING TIME (ELAPSED TIME) | ENVIRONMENT CONDITION | IMMEDIATELY PRECEDING BEHAVIOR | ENDING TIME (ELAPSED TIME) | |
| 1 | 00010 | .... | .... | .... | .... | .... |
| 2 | 00011 | 10min | 3m OR LESS | ACCELERATION/ STEERING | 20min | STOP |
| 3 | 00012 | 5min | 3m OR LESS | ACCELERATION/ STEERING | 20min | STOP |
| ... | .... | .... | .... | .... | .... | .... |
| N | | | | | | |

| BEHAVIOR PLAN ID | BEHAVIOR STARTING CONDITION ||||| BEHAVIOR ENDING CONDITION | BEHAVIOR |
|---|---|---|---|---|---|---|
| | STARTING TIME (ELAPSED TIME) | EXCLUSIVE CONTROL | ENVIRONMENT CONDITION | IMMEDIATELY PRECEDING BEHAVIOR | ENDING TIME (ELAPSED TIME) | |
| 00011 | 10min | ○ | 3m OR LESS | ACCELERATION/ STEERING | 20min | STOP |
| ... | ... | ... | ... | ... | ... | ... |

*FIG. 9A*

| SAFETY RULE ID | INTERDICTION CONDITION | | | ADDITIONAL CONDITION | | | |
|---|---|---|---|---|---|---|---|
| | STARTING TIME (ELAPSED TIME) | ENVIRONMENT CONDITION | IMMEDIATELY PRECEDING BEHAVIOR | STARTING TIME (ELAPSED TIME) | ENVIRONMENT CONDITION | IMMEDIATELY PRECEDING BEHAVIOR | BEHAVIOR |
| 00001 | 10min | 3m OR LESS | ACCELERATION/ STEERING | 10min | 3m OR LESS | BACKING | STOP |
| .... | .... | .... | .... | .... | .... | .... | .... |

| SAFETY RULE ID | PERMISSION CONDITION ||| EXCLUSION CONDITION ||| BEHAVIOR |
| --- | --- | --- | --- | --- | --- | --- | --- |
| | STARTING TIME (ELAPSED TIME) | ENVIRONMENT CONDITION | IMMEDIATELY PRECEDING BEHAVIOR | STARTING TIME (ELAPSED TIME) | ENVIRONMENT CONDITION | IMMEDIATELY PRECEDING BEHAVIOR | |
| 00001 | 10min | 3m OR MORE | ACCELERATION/ STEERING | 10min | 3m OR MORE | BACKING | ACCELERATION |
| ···· | ···· | ···· | ···· | ···· | ···· | ···· | ···· |

61

FIG. 12
(a)
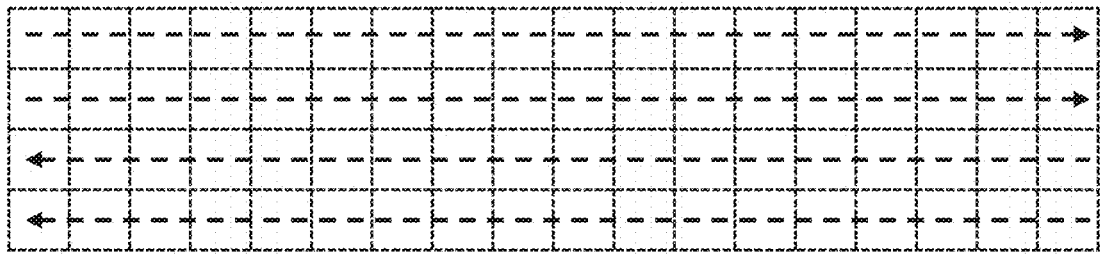
RULE FOR AUTOMOBILE SYSTEM
(LEFT-SIDE TRAVELING ON TWO-LANES
IN EACH DIRECTION/LANE CHANGE OMITTED)
(b)
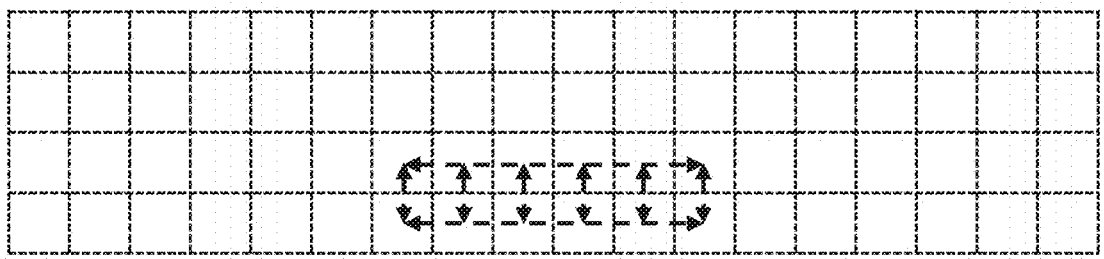
RULE FOR CONSTRUCTION MACHINE SYSTEM
(FREE DRIVING IN CONSTRUCTION SECTION)
(c)
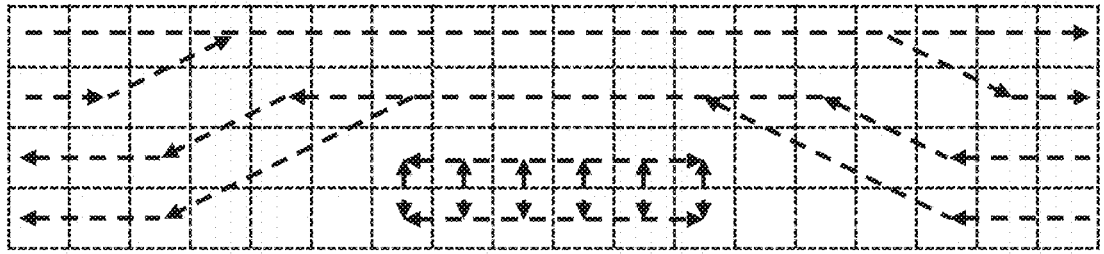
COMMON TRAVEL ROUTES

SAFETY CONTROL DEVICE AND SAFETY RULE ADJUSTMENT METHOD

TECHNICAL FIELD

The present invention relates to control in an environment in which a plurality of control targets controlled by disparate systems mixedly exist. Note that the control target includes a mobile body such as a vehicle, and a plant such as a factory and a power plant.

BACKGROUND ART

At present, control technologies such as automatic driving are developed in various fields according to advances in technologies such as artificial intelligence (AI). For example, automatic driving techniques and driving support techniques for automobiles have been developed in the transportation field. Here, different automatic driving techniques or driving support techniques mixedly exist on the road. In addition, on the road, automobiles to which these techniques are applied and manually driven automobiles also mixedly exist. Furthermore, in the case of loading and unloading a warehouse or the like using a robot which is one of control targets, a worker may support work of the robot.

In the control technology in which disparate systems such as a person and a machine mixedly exist as described above, it is required to ensure the safety of the operation of the control target. For example, it is required to prevent collision of the control target, as well as a bodily injury accident and a property damage accident of the control target.

A technique for ensuring such safety is disclosed in PTL 1. An object of PTL 1 is to ensure sufficient safety even when a worker and a machine coexist and work in cooperation. In order to solve this problem, PTL 1 includes: a generation unit that generates a predicted flow line of a worker on the basis of a history of position information of the worker, and generates a predicted flow line of a machine on the basis of a history of position information of the machine and/or a set operation range; a determination unit that predicts the positions of the worker and the machine from the current positions of the worker and the machine in the work area and the predicted flow line of the worker and the predicted flow line of the machine generated by the generation unit, and determines whether or not the predicted positions have a predetermined positional relationship on the basis of a determination criterion; and a notification unit that, when the determination unit determines that the predetermined positional relationship is established, notifies information indicating that effect. It is further disclosed that sufficient safety can be ensured even when the worker and the machine coexist and work in cooperation.

CITATION LIST

Patent Literature

PTL 1: JP 2020-96517 A

SUMMARY OF INVENTION

Technical Problem

According to PTL 1, it is possible to carry out accident avoidance such as outputting an alert according to a positional relationship between the worker (person) and the machine. However, every time an accident risk occurs, a response can only be made in an impromptu way, and it is difficult to fundamentally reduce the accident risk. For this reason, in PTL 1, when control that gives too much priority to safety is carried out, stoppage of the machine increases, leading to a decrease in work efficiency. To the contrary, if too much priority is given to work efficiency, safety is lost. Therefore, in PTL 1, there is a problem that it is difficult to balance ensuring of work efficiency and safety in an environment in which the disparate systems mixedly exist.

Solution to Problem

In order to solve the aforementioned problem, in the present invention, each adjustment is executed in the order of "behavior adjustment"→"behavior plan adjustment"→"safety rule adjustment". A more specific example of the configuration of the present invention is a safety control device for controlling behavior of each control target in disparate systems under a plurality of control systems, the safety control device including: a behavior adjustment unit which, in a case where a conflict deviating from a control result in which behavior of a control target is assumed occurs, outputs a behavior adjustment instruction for adjusting behavior to the control target, the control target being among control targets of different types of control systemization; a behavior plan adjustment unit which, in a case where the adjustment of the behavior satisfies a predetermined condition, adjusts a behavior plan indicating a behavior regulation for avoiding a conflict and exerting a function in the control target stored in advance; and a safety rule adjustment unit which, in a case where the adjustment of the behavior plan satisfies a predetermined condition, adjusts a safety rule indicating a behavior regulation stored in advance for avoiding a conflict in the control target.

The present invention also encompasses a safety rule adjustment method and a safety control method using the safety control device, a computer program for executing the safety rule adjustment method, and a storage medium storing the computer program.

Advantageous Effects of Invention

According to the present invention, it is possible to secure work efficiency and safety for behavior of a control target in an environment in which disparate systems exits mixedly.

BRIEF DESCRIPTION OF DRAWINGS

FIG. 3 is a system configuration diagram of each mobile body in the first embodiment.

FIG. 4 is a functional block diagram according to the first embodiment.

FIG. 5A is a diagram illustrating an example in which a safety rule in the first embodiment includes a negative list.

FIG. 5B is a diagram illustrating an example in which a safety rule in the first embodiment includes a positive list.

FIG. 6A is a diagram illustrating a behavior plan according to the first embodiment.

FIG. 6B is a diagram schematically illustrating the behavior plan in graph representation.

FIG. 8B is a diagram for describing a specific example (condition addition) of adjustment of the behavior plan in the first embodiment.

FIG. 9A is a diagram for describing a specific example of adjustment of a safety rule including a negative list in the first embodiment.

FIG. 9B is a diagram for describing a specific example of adjustment of a safety rule including a positive list in the first embodiment.

FIG. 12 is a diagram illustrating a travel route in the third embodiment.

DESCRIPTION OF EMBODIMENTS

Hereinafter, each embodiment of the present invention will be described with reference to the drawings. In each of the following embodiments, control is performed in disparate systems, that is, in an environment in which a plurality of control targets controlled under different control systems exist mixedly. Note that this environment includes a control area indicating a geographical range of control.

In addition, safety in each embodiment means avoiding a conflict in the control target. Furthermore, the conflict indicates a state in which the behavior of the control target deviates from the assumed control result. For this reason, the conflict includes an accident, a collision, a dangerous event (event in which time to collision (TTC) becomes less than or equal to a predetermined value), a failure, an unachieved effect, and other events that impair the control result in the control target.

Furthermore, the behavior indicates a function of the control target. Therefore, the behavior includes traveling of the mobile body, load carrying, construction, architecture, power control such as power generation, power distribution, and power reception, and other operations and actions.

Furthermore, under the control system, there may also be an autonomously controlled device. Therefore, a case where there is a plurality of devices that perform autonomous control also falls under the disparate system. As described above, the system in each embodiment is not necessarily limited to a computer system including a server and the like, and includes individual devices.

First Embodiment

A first embodiment illustrates a general-purpose example in a case where a mobile body is used as a control target. Furthermore, in the present embodiment, traveling of the mobile body will be described as an example of behavior.

Figure 1:
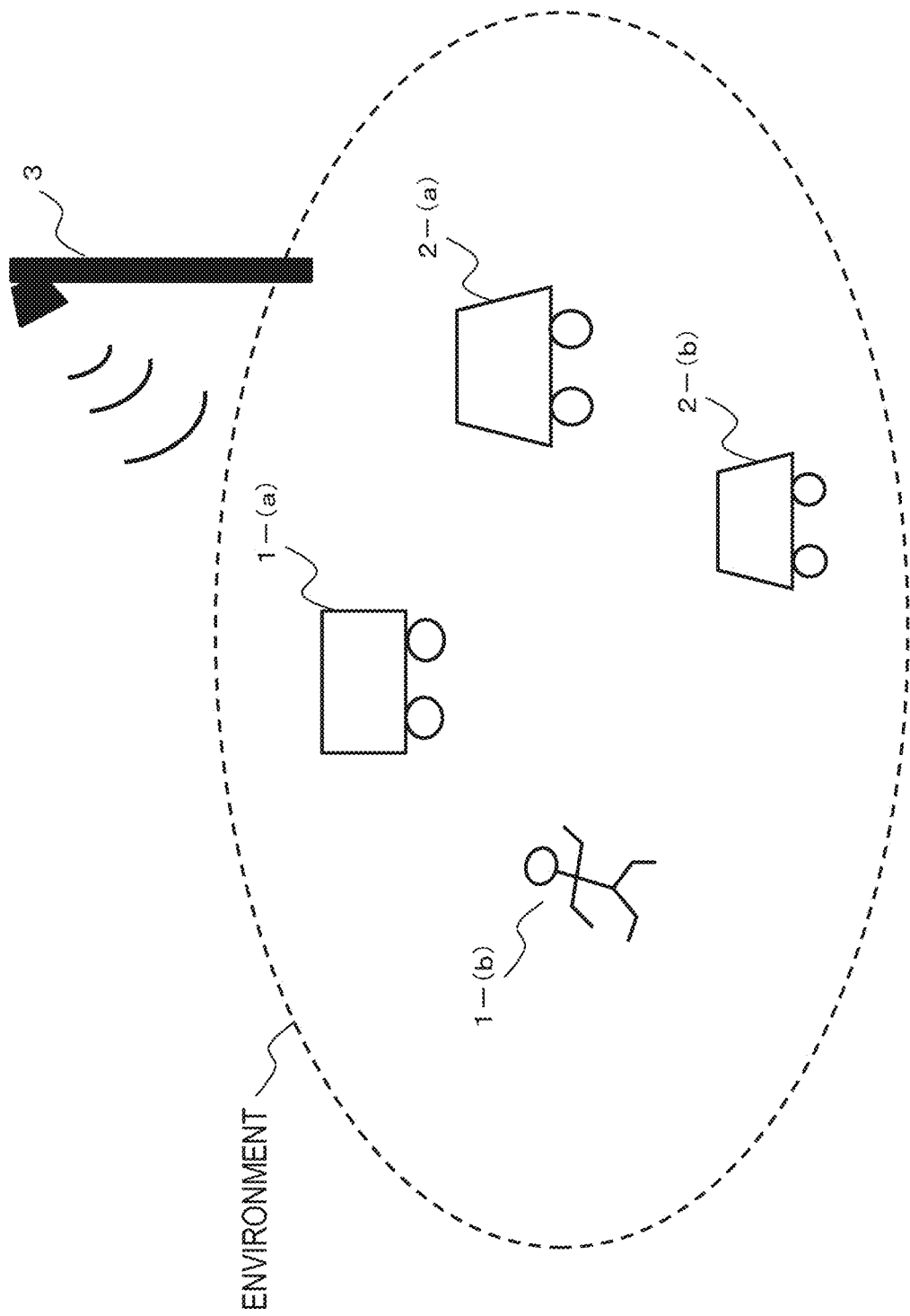
FIG. 1 is a diagram schematically illustrating an environment to which a first embodiment is applied.

FIG. 1 is a diagram schematically illustrating an environment to which each embodiment is applied. In the environment of FIG. 1, there are various mobile bodies as control targets. Among them, it is assumed that the mobile body 1-($a$) and mobile body 1-($b$) are for example autonomously performing control, and not under the control system of a safety control server 5 to be described later. For example, the mobile body 1-($a$) is a vehicle that travels according to a driver's operation or a driving support function or an automatic driving function provided therein, and the mobile body 1-($b$) is a person.

In addition, the mobile body 2-($a$) and mobile body 2-($b$) have a function of traveling under a control system of a so-called system (the safety control server 5 to be described later). The infrastructure sensor device 3 detects the travel situation of each mobile body, particularly the mobile body 1-($a$) and mobile body 1-($b$), and notifies the result to the safety control server 5. Note that the numbers of the mobile bodies and the infrastructure sensor device 3 in FIG. 1 are not limited to the illustrated numbers. For example, it is preferable that a plurality of infrastructure sensor devices 3 is installed.

Figure 2:
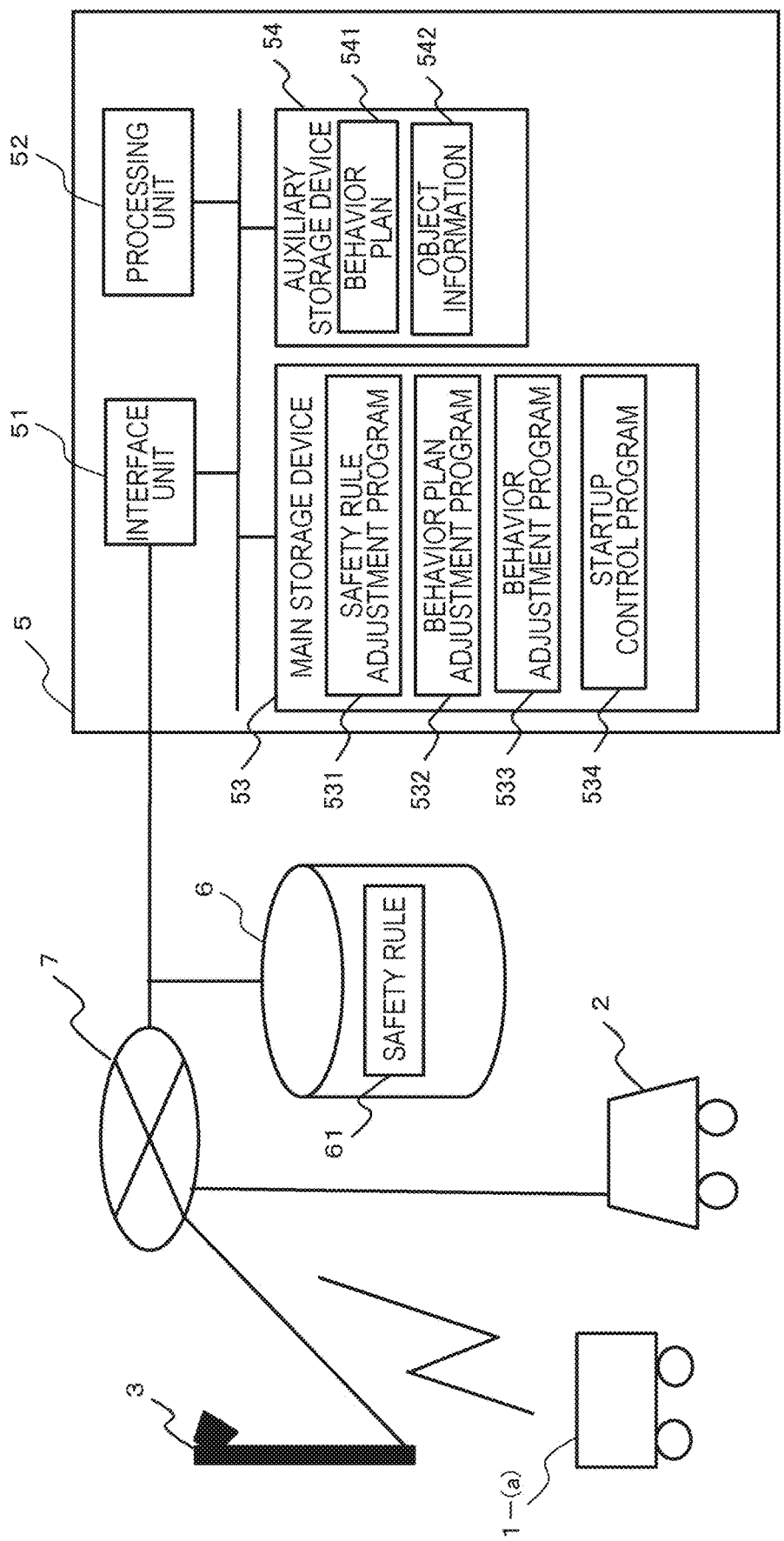
FIG. 2 is a system configuration diagram according to the first embodiment.

Next, with reference to FIGS. 2 to 4, a system for realizing the first embodiment, in particular, a configuration of the safety control server 5 and each mobile body will be described. FIG. 2 is a system configuration diagram according to the first embodiment. Note that in FIG. 2, the mobile body 2-($a$) and mobile body 2-($b$) have the same configuration, and will thus be collectively referred as the mobile body 2. In addition, since the mobile body 1-($b$) is a person, description thereof is omitted. In FIG. 2, the mobile body 1-($a$), the mobile body 2, the infrastructure sensor device 3, and the safety control server 5 are connected via a network 7. In addition, a safety rule DB 6 that stores a safety rule 61 is connected to the safety control server 5. Note that the safety rule 61 may be stored in an auxiliary storage device 54 of the safety control server 5. Furthermore, the safety rule DB 6 may be connected via the network 7. Note that, as described above, the system according to the present embodiment does not require a server. Therefore, the control target itself may have the function of the safety control server 5 of the present embodiment.

In FIG. 2, the safety control server 5 is realized by a so-called computer that functions as a safety control device. The safety control server 5 includes an interface unit 51 for transmitting and receiving information such as communication with an external device, a processing unit 52 that performs various calculations, a main storage device 53 that can be implemented by a memory, and an auxiliary storage device 54 that can be implemented by a storage. In addition, these are connected to each other via communication paths such as a bus. Note that the interface unit 51 may be configured by an input interface and an output interface, by separating input and output functions.

Here, the processing unit 52 is realized by a processor, a CPU, or the like, and performs calculation according to each computer program developed in the main storage device 53. In the main storage device 53, computer programs stored in the auxiliary storage device 54 and other storage media and other information necessary for calculation are developed. Here, the computer program developed in the main storage device 53 includes a safety rule adjustment program 531, a behavior plan adjustment program 532, a behavior adjustment program 533, and a startup control program 534. Each of these computer programs may not be an independent computer program. That is, these may be realized as modules of a computer program.

Furthermore, the auxiliary storage device 54 can be realized by a so-called storage such as a hard disk drive (HDD) or a solid state drive (SSD). Then, the auxiliary storage device 54 stores behavior plan 541 as information. In addition, the auxiliary storage device 54 may store object information 542 detected by the infrastructure sensor device 3 or each mobile body.

Furthermore, the infrastructure sensor device 3 is a sensor installed in a control area such as a road, and detects movement of each mobile body, particularly the mobile body 1-(*a*) and the mobile body 1-(*b*) not under the control system of the safety control server 5. For this reason, the infrastructure sensor device 3 can be realized by various vehicle detectors. The vehicle detector includes a laser, a loop coil, image recognition (camera), a beacon, and the like, no matter what principle it employs.

Next, FIG. 3 is a system configuration diagram of each mobile body in the first embodiment. Here, the mobile body 1-(*a*) is controlled under a control system other than the safety control server 5. The control system other than the safety control server 5 includes, for example, traveling according to autonomous control or control by another control system.

FIG. 3A illustrates a configuration of the mobile body 1-(*a*). The mobile body 1-(*a*) includes a mobile body controller 11, a mobile body sensor 12, a mobile body actuator 13, a driving device 14, and a communication unit 15. Then, these are connected to each other via an in-vehicle communication network 16.

Here, the mobile body controller 11 controls the travel and operation of the mobile body 1-(*a*), and can be realized by a so-called electronic control unit (engine control unit) (ECU). For this purpose, the mobile body controller 11 includes a CPU 1111, a micro controller unit (MCU) 111 including a memory 1112, an input interface 112, an output interface 113, and a storage medium 114. In the MCU 111, the CPU 1111 executes various operations according to the program in the memory 1112. Note that the MCU 111 may be capable of executing various operations using a field-programmable gate array (FPGA) technology. Note that the mobile body controller 11 may have a driving support function or an automatic driving function.

In addition, the mobile body sensor 12 includes a laser, a lidar, a millimeter wave radar, a camera, and the like, detects an obstacle and a situation of a road around the own vehicle, and measures an inter-vehicle distance and an azimuth with other mobile bodies and obstacles. Furthermore, the mobile body sensor 12 may be realized by a combination of a plurality of types described above.

The mobile body actuator 13 is an actuator for travel of the mobile body 1-(*a*). Specifically, a prime mover 131 realized by an engine, a motor, a battery, and the like as a power source, and a drive unit 132 realized by a drive shaft, a brake, and the like are included. That is, the mobile body 1-(*a*) executes travel by driving the power from the prime mover 131 via the drive unit 132.

In addition, the driving device 14 controls the mobile body 1-(*a*) in response to the operation by the driver, and includes a steering device 141 such as a steering and a braking device 142 such as an accelerator pedal and a brake pedal. Furthermore, the communication unit 15 communicates with an external device via the network 7. Furthermore, the in-vehicle communication network 16 can be realized by a so-called controller area network (CAN).

In addition, FIG. 3B illustrates a configuration of the mobile body 2. The mobile body 2 is a mobile body under the control system of the safety control server 5. The mobile body 2 includes an on-board controller 21, a mobile body sensor 22, a mobile body actuator 23, and a communication unit 25. These are connected to each other via the in-vehicle communication network 26. Since these configurations are similar to those of the mobile body 1-(*a*), the description thereof will be omitted. In the present embodiment, the mobile body 2 will be described as an unmanned driving vehicle, but may be manned similarly to the mobile body 1-(*a*). That is, a driving device, which is not illustrated, may be provided in the mobile body 2.

Next, FIG. 4 is a functional block diagram according to the first embodiment. FIG. 4 illustrates respective functional blocks of the mobile body 1-(*a*), the mobile body 2, the infrastructure sensor device 3, and the safety control server 5.

First, the mobile body 1-(*a*) includes the mobile body controller 11 and the mobile body sensor 12. These are the same as those described in FIG. 3. Here, the mobile body controller 11 includes a sensor processing unit 11-1 that converts a signal detected by the mobile body sensor 12 into object information 542. Then, the sensor processing unit 11-1 outputs the object information 542 to the safety control server 5.

Note that, in this drawing, the operation of the mobile body actuator 13 based on the instruction from the safety control server 5 is not executed, and thus the description thereof is omitted. In addition, it is preferable that the mobile body actuator 13 has a function of controlling the operation thereof on the basis of the object information 542 output by the sensor processing unit 11-1.

Next, the mobile body 2 includes a mobile body actuator 23 that executes operations based on the instructions from the on-board controller 21, the mobile body sensor 12, and the safety control server 5. These are the same as those described in FIG. 3.

The on-board controller 21 includes a sensor processing unit 21-1, a behavior plan control unit 21-2, and a behavior control unit 21-3. Here, the sensor processing unit 21-1 has a function similar to that of the sensor processing unit 11-1, that is, includes the sensor processing unit 21-1 that converts a signal detected by the mobile body sensor 22 into the object information 542. In addition, the behavior plan control unit 21-2 and the behavior control unit 21-3 execute calculation for controlling travel of the mobile body 2 on the basis of outputs from the sensor processing unit 21-1 and the safety control server 5. This calculation will be described later.

The infrastructure sensor device 3 includes an infrastructure sensor controller 31 and an infrastructure sensor 32. Here, the infrastructure sensor controller 31 includes a sensor processing unit 31-1 similarly to the mobile body controller 11. The infrastructure sensor 32 detects the travel of the mobile body and outputs a signal thereof to the sensor processing unit 31-1. Then, the sensor processing unit 31-1 converts the detected signal into the object information 542 and outputs to the safety control server 5.

Next, the safety control server 5 will be described. The safety control server 5 executes calculation for realizing control of the mobile body 2 under the control systemization. For this purpose, the safety control server 5 uses the safety rule 61 stored in the safety rule DB 6, and the object information 542 from the mobile body 1-(*a*), the mobile body 2 and the infrastructure sensor device 3.

Here, the safety control server 5 includes a safety rule adjustment unit 5310, a behavior plan adjustment unit 5320, a behavior adjustment unit 5330, and a startup control unit 5340. These correspond to the processing unit 52 illustrated in FIG. 2. More specifically, the calculation according to each computer program is executed in each unit. The correspondence will be shown below. Note that the control area monitoring unit 5350 corresponds to the interface unit 51 in FIG. 2.

Safety rule adjustment program 531: Safety rule adjustment unit 5310

Behavior plan adjustment program 532: Behavior plan adjustment unit 5320

Behavior adjustment program 533: Behavior adjustment unit 5330

Startup control program 534: Startup control unit 5340

Hereinafter, functions of the respective units will be briefly described. Details thereof will be separately described with reference to flowcharts.

The startup control unit 5340 controls startup of the safety rule adjustment unit 5310, the behavior plan adjustment unit 5320, and the behavior adjustment unit 5330. In addition, the control area monitoring unit 5350 acquires the object information 542 from each mobile body and the infrastructure sensor device 3. In addition, the safety rule adjustment unit 5310 accesses the safety rule DB 6 and carries out adjustment (including correction) of the safety rule 61 using the object information 542.

Furthermore, the behavior plan adjustment unit 5320 carries out adjustment (including correction) of the behavior plan 541 of the mobile body 2 using the safety rule 61 from the safety rule adjustment unit 5310 and the object information 542 from the control area monitoring unit 5350. Then, the behavior plan adjustment unit 5320 outputs a behavior plan adjustment instruction or a safety rule adjustment instruction to the mobile body 2. Note that the safety rule adjustment unit 5310 may also output the safety rule adjustment instruction. Furthermore, the behavior adjustment unit 5330 outputs a behavior adjustment instruction using the safety rule 61 from the safety rule adjustment unit 5310 and the behavior plan 541 from the behavior plan adjustment unit 5320. The behavior adjustment instruction includes continuation or stop of behavior. Here, in the case of continuation of the behavior, the behavior adjustment unit 5330 may realize the continuation by suppressing the output of the behavior adjustment instruction. Although FIG. 4 does not illustrate the mobile body 1-(*b*) of the present embodiment, the mobile body 1-(*b*), which is a person, may be provided with the same configuration as that of the mobile body 1-(*a*). For example, the configuration can be realized by a person carrying a terminal device such as a wearable computer or a smartphone.

Next, information used in the present embodiment will be described with reference to FIGS. 5A, 5B, 6A, and 6B. FIGS. 5A and 5B illustrate the safety rule 61 used in the present embodiment. The safety rule 61 is a rule that defines traveling of the mobile body 2. In the present embodiment, the safety rule 61 associates a condition and behavior in behavior (travel) with each safety rule ID for identifying the safety rule 61.

Here, FIG. 5A is a diagram illustrating an example in which the safety rule 61 in the present embodiment includes a negative list. For this reason, an interdiction condition interdicted in the behavior is used as the condition in the behavior. As a result, this negative list associates the interdiction condition with the behavior of when the condition is satisfied, that is, the content of control in traveling.

Here, in FIG. 5A, the interdiction condition includes a starting time (elapsed time), an environment condition, and immediately preceding behavior. The starting time indicates the elapsed time during which the mobile body 2 performs the behavior. The environment condition indicates a condition such as a distance to another object (including a mobile body and an obstacle). Furthermore, the immediately preceding behavior indicates behavior of the mobile body 2 within a certain period of time. These are examples, and in the behavior of the mobile body 2, it is only required to indicate a condition in a case where the behavior is interdicted, that is, a behavior to be avoided. Therefore, items other than the starting time (elapsed time), the environment condition, and the immediately preceding behavior may be provided, or some of these items may be omitted. Then, the behavior of the safety rule 61 indicates the content of control on the mobile body 2 in a case where these are satisfied. In FIG. 5A, the stop has been described as an example of the behavior. However, in a case where the mobile body 2 is a forklift, the following detailed contents may be used. "The arm moving at (speed) m/s in the direction of x° is moved up/down by (height) cm and turned by the direction of y° (counter) clockwise."

Note that the safety rule 61 is not limited to the negative list. Next, an example in which the safety rule 61 is configured with the positive list will be described. FIG. 5B is a diagram illustrating an example in which the safety rule 61 in the present embodiment includes a positive list. In this positive list, as compared with the negative list in FIG. 5A, the interdiction condition is formally changed to the permission condition.

In FIG. 5B, the permission condition indicates a condition for performing behavior included in the positive list, that is, an allowable behavior, in the behavior of the mobile body 2. Therefore, in the negative list and the positive list, the environment information is a contradictory condition. In addition, the behavior is also different.

Note that, in the safety rule 61, behavior may be configured to be linked as separate information.

Furthermore, the safety rule 61 may be realized by a combination of a negative list and a positive list.

Next, FIG. 6A illustrates a behavior plan 541 used in the present embodiment. The behavior plan 541 is information based on the safety rule 61 and indicates a plan of behavior. Therefore, the behavior plan 541 of the present embodiment also has a property of a positive list, but is not limited thereto.

Here, the behavior plan 541 associates a behavior starting condition, a behavior ending condition, and a behavior with each behavior plan ID for identifying a behavior plan. The behavior starting condition is similar to the permission condition of the safety rule 61. The behavior ending condition indicates a condition for ending the corresponding behavior. Furthermore, behaviors are items similar to those of the safety rule 61. Note that the behavior plan 541 is also not limited to the contents illustrated in FIG. 6A.

Here, FIG. 6B is a diagram schematically illustrating the behavior plan 541 in graph representation. In FIG. 6B, arrows indicate respective behaviors of the mobile body 2. A circle portion indicates the behavior starting condition, and a cross portion indicates the behavior ending condition. In this manner, the entire time-series behavior of the mobile body 2 is defined by the set of arrows. Therefore, the immediately preceding behavior of behavior A in the drawing can be identified as "travel at (speed) m/s in the direction of X°" indicated by the arrow.

Note that, more preferably, the safety rule 61 is information in consideration of safety for avoiding conflict such as collision of the mobile body 2, and the behavior plan 541 is desirably information in consideration of work and operation efficiency in the mobile body 2 in addition to safety.

That is, the safety rule 61 defines a behavior regulation for avoiding a conflict in the control target, and the behavior plan 541 indicates a behavior regulation for avoiding a conflict in the control target and exerting a function.

Figure 7:
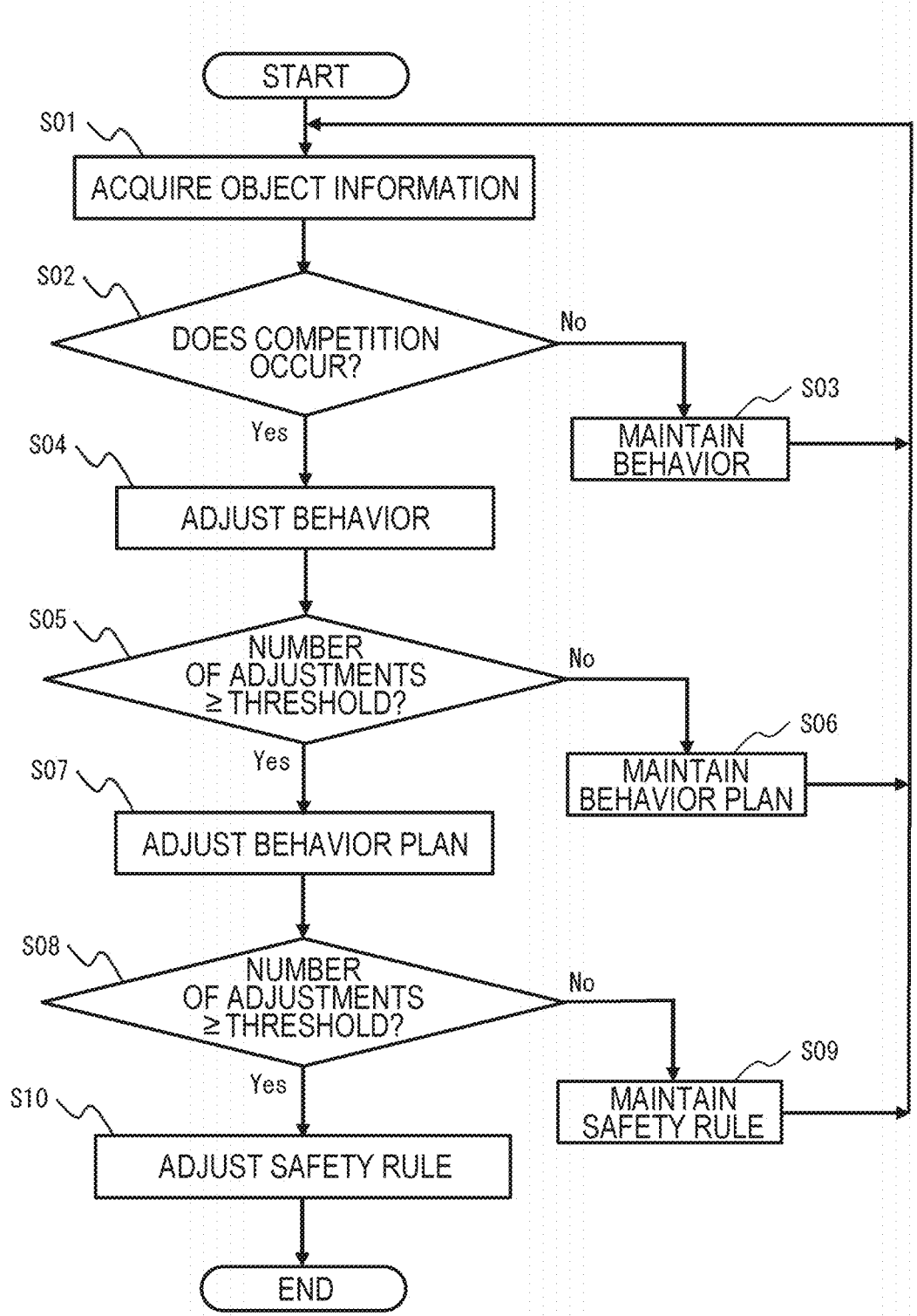
FIG. 7 is a flowchart showing a processing procedure in the first embodiment.

The above has been the description of the information used in the present embodiment, and the details of the processing of the present embodiment will be described below. FIG. 7 is a flowchart showing a processing procedure in the present embodiment. Here, before describing FIG. 7, the premise of this flowchart will be described. In the environment of FIG. 1, each mobile body travels, that is, behaves in the environment. At this time, each mobile body and the infrastructure sensor device 3 detect a status of traveling thereof (traveling status). Specifically, the mobile body 1-(*a*) detects another object such as an obstacle and its own traveling status by its own mobile body sensor 12.

In addition, the mobile body 2 also detects another object such as an obstacle and its own traveling status by its own mobile body sensor 22. Furthermore, the infrastructure sensor device 3 also detects an object such as an obstacle and a traveling status of each mobile body by the infrastructure sensor 32. Note that the traveling status also includes detection of a stationary object and a mobile body.

Then, in each device, the sensor processing unit converts a signal indicating the traveling status into object information 542 which is information that can be subjected to information processing. Specifically, in the mobile body 1-(*a*), the sensor processing unit 11-1 of the mobile body controller 11 converts a signal detected by the mobile body sensor 12 into the object information 542. Then, the object information 542 is output from the sensor processing unit 11-1 to the control area monitoring unit 5350 of the safety control server 5 via the network 7.

In the mobile body 2, the sensor processing unit 21-1 of the on-board controller 21 converts a signal detected by the mobile body sensor 22 into the object information 542. Then, the object information 542 is output from the sensor processing unit 21-1 to the control area monitoring unit 5350 of the safety control server 5 via the network 7.

Furthermore, in the infrastructure sensor device 3, the sensor processing unit 31-1 of the infrastructure sensor controller 31 converts a signal detected by the infrastructure sensor 32 into the object information 542. Then, the object information 542 is output from the sensor processing unit 31-1 to the control area monitoring unit 5350 of the safety control server 5 via the network 7. Note that the infrastructure sensor device 3 may be omitted. Furthermore, the use of the mobile body sensor of each mobile body may be omitted by limiting to the infrastructure sensor device 3, or control may be considered for a mobile body not including a mobile body sensor.

Furthermore, the mobile body 2 stores its own behavior plan 541 in a storage medium. Then, the behavior plan control unit 21-2 creates a behavior instruction on the basis of the object information 542 from the sensor processing unit 21-1 and its own behavior plan 541. Then, the behavior plan control unit 21-2 outputs the behavior instruction to the behavior control unit 21-3. In response to this, the behavior control unit 21-3 outputs a control signal to the mobile body actuator 23. As a result, the mobile body 2 executes traveling based on the behavior plan 541.

Hereinafter, the subject of each step will be described using each unit in the functional block diagram of FIG. 4. First, in step S01, the control area monitoring unit 5350 acquires the object information 542 from each sensor processing unit.

Next, in step S02, the startup control unit 5340 starts up the behavior adjustment unit 5330 with the acquisition of the object information 542 in step S01 as a trigger. Then, the behavior adjustment unit 5330 determines whether a conflict occurs in each mobile body 2 (mobile bodies 2-(*a*) and 2-(*b*)) using the object information 542 acquired in Step S02. Here, the occurrence of the conflict may be determined based on whether a numerical value indicating the possibility is greater than or equal to a predetermined value. More specifically, the behavior adjustment unit 5330 determines which behavior of each mobile body 2 indicated by the object information 542 satisfies the interdiction condition of the safety rule 61 or the behavior plan 541. As a result, in a case of non-satisfaction (No), the process proceeds to step S03. In addition, in a case of satisfaction (Yes), the process proceeds to step S04. Note that, although satisfaction of the interdiction condition is determined herein, when a positive list as illustrated in FIG. 5B is used as the safety rule 61, non-satisfaction of the permission condition may be determined.

Next, in step S03, the behavior adjustment unit 5330 transmits an instruction of maintaining the behavior at that time as a behavior adjustment instruction to the on-board controller 21 of the mobile body 2 via the network 7. At this time, the behavior adjustment unit 5330 desirably uses a configuration having a communication function such as the interface unit 51 such as the control area monitoring unit 5350. Hereinafter, the same applies to the communication in the safety control server 5. Furthermore, in step S03, the behavior adjustment unit 5330 may execute a process of watching without transmitting the instruction. Then, the process returns to step S01.

In addition, in step S04, the behavior adjustment unit 5330 transmits an instruction of stopping the behavior at that time as a behavior adjustment instruction to the on-board controller 21 of the mobile body 2 via the network 7. In this case, as the behavior adjustment instruction, a behavior adjustment instruction described in the behavior of the safety rule 61 or the behavior plan 541 may be transmitted. In this way, in this step, a change is made to the traveling of the mobile body 2.

As a result of steps S03 and S04, the behavior control unit 21-3 of the mobile body 2 creates a control signal according to the behavior adjustment instruction output from the behavior adjustment unit 5330. Then, the behavior control unit 21-3 outputs a control signal to the mobile body actuator 23. As a result, the mobile body 2 can travel according to the behavior adjustment instruction.

Next, in step S05, the startup control unit 5340 determines whether the behavior plan 541 needs to be adjusted. For example, the startup control unit 5340 determines whether the behavior adjustment in step S04 satisfies a predetermined condition. As a result, when the predetermined condition is not satisfied (No), the process proceeds to step S06. When the predetermined condition is satisfied (Yes), the process proceeds to step S07. An example of the predetermined condition includes the number of times of adjustment of behavior within a predetermined period, that is, the frequency of adjustment. In this case, in this step, the startup control unit 5340 determines whether the value is greater than or equal to a predetermined threshold value.

Next, in step S06, the behavior plan is maintained, that is, the processing returns as is to step S01 without executing any special processing.

In step S07, the startup control unit 5340 activates the behavior plan adjustment unit 5320. Then, the behavior plan adjustment unit 5320 adjusts the behavior plan 541. That is, the behavior plan adjustment unit 5320 corrects the behavior plan 541 stored in the auxiliary storage device 54. Furthermore, the behavior plan adjustment unit 5320 outputs the modified behavior plan 541 to each of the mobile bodies 2 via the network 7.

Note that the execution timing of this step may be within the same period as step S05 (real-time reflection) or may be another period (batch reflection). In the case of the real-time reflection, the behavior plan adjustment unit 5320 may execute step S07, for example, within the execution time or within the execution date of step S05. In the case of the batch reflection, the adjustment is performed together with other adjustments on the next day of the execution date of step S05 or after the end of the control on the current day. In real-time reflection and batch reflection, it is desirable to change the determination criteria in step S05. For example, in the case of the threshold value, it is desirable to change the threshold value for the real-time reflection. By increasing the threshold of the real-time reflection, it is possible to suppress the number of times of adjustment of the behavior plan being controlled.

Here, a specific example of adjustment of the behavior plan 541 will be described with reference to FIGS. 8A and 8B.

Figure 8A:
FIG. 8A is a diagram for describing a specific example (priority change) of adjustment of the behavior plan in the first embodiment.

FIG. 8A is a diagram for describing a specific example of changing priority as adjustment of the behavior plan in the present embodiment. In this example, in the behavior plan 541, a priority is added to each record as compared with the behavior plan 541 illustrated in FIG. 6A. This indicates the degree of priority of the behavior plan used when controlling the behavior of each mobile body 2.

In this step, the behavior plan adjustment unit 5320 specifies a behavior that has caused the behavior plan adjustment. For example, the behavior plan adjustment unit 5320 specifies a behavior that satisfies the predetermined condition in step S05. Then, the behavior plan adjustment unit 5320 specifies a behavior plan corresponding thereto. That is, the behavior plan adjustment unit 5320 specifies a behavior starting condition in the interdiction condition in step S02. For example, in the example of FIG. 8A, a behavior starting condition of a behavior plan ID=00011 is specified.

Next, the behavior plan adjustment unit 5320 lowers the priority of the record including the specified behavior starting condition. In the example of FIG. 8A, the behavior plan adjustment unit 5320 changes the priority from priority 2 to priority 3 or lower.

Next, FIG. 8B is a diagram for describing a specific example of adding a condition as adjustment of the behavior plan in the present embodiment. Similarly to FIG. 8A, also in this example, the behavior plan adjustment unit 5320 specifies a behavior starting condition in the interdiction condition in step S02. Also in this example, the behavior starting condition of the behavior plan ID=00011 is specified.

Next, the behavior plan adjustment unit 5320 adds the exclusive control to the starting condition among the specified behavior starting condition. This addition process may be a process of validating the exclusive control. Note that this exclusive control includes a so-called semaphore.

Thus, the adjustment of the behavior plan, that is, the description of step S07 has been completed, and the description of step S08 will subsequently be made. In step S08, the startup control unit 5340 determines whether adjustment of the safety rule 61 is necessary. For example, the startup control unit 5340 determines whether the behavior plan adjustment in step S07 satisfies a predetermined condition.

As a result, when the predetermined condition is not satisfied (No), the process proceeds to step S09. When the predetermined condition is satisfied (Yes), the process proceeds to step S10. An example of the predetermined condition includes the number of times of adjustment of behavior within a predetermined period, that is, the frequency of adjustment. In this case, in this step, the startup control unit 5340 determines whether the value is greater than or equal to a predetermined threshold value.

Next, in step S09, the behavior plan is maintained, that is, the processing returns as is to step S01 without executing any special processing.

In step S10, the startup control unit 5340 activates the safety rule adjustment unit 5310. Then, the safety rule adjustment unit 5310 adjusts the safety rule 61. That is, the safety rule adjustment unit 5310 corrects the safety rule 61 stored in the safety rule DB 6.

Note that, similarly to step S07, the execution timing of this step may be within the same period as step S08 (real-time reflection) or may be another period (batch reflection). In this case, similarly to step S07, it is desirable to change the determination criteria in real-time reflection and batch reflection.

Here, a specific example of adjustment of the safety rule 61 will be described with reference to FIGS. 9A and 9B.

First, FIG. 9A is a diagram for describing a specific example of adjustment of the safety rule 61 including a negative list in the present embodiment. The safety rule adjustment unit 5310 specifies behavior that has caused the adjustment of the safety rule. For example, the safety rule adjustment unit 5310 specifies behavior that satisfies the predetermined condition in step S08. Then, the safety rule adjustment unit 5310 specifies the safety rule 61 corresponding thereto. That is, the safety rule adjustment unit 5310 specifies the interdiction condition in step S02. As a result, it is assumed that the interdiction condition of the safety rule ID=000001 illustrated in FIG. 9A is specified.

Then, the safety rule adjustment unit 5310 adds the additional condition to the corresponding record as illustrated in FIG. 9A. As the additional condition, the safety rule adjustment unit 5310 specifies and records a condition in the behavior that has caused the safety rule adjustment. In the control, the interdiction condition and the additional condition are desirably treated as OR conditions.

Next, FIG. 9B is a diagram illustrating a specific example of adjustment of the safety rule 61 including the positive list in the present embodiment. The safety rule adjustment unit 5310 specifies behavior that has caused the adjustment of the safety rule. For example, the safety rule adjustment unit 5310 specifies behavior that satisfies the predetermined condition in step S08. Then, the safety rule adjustment unit 5310 specifies the safety rule 61 corresponding thereto. That is, the safety rule adjustment unit 5310 specifies the interdiction condition in step S02. As a result, it is assumed that the interdiction condition of the safety rule ID=000001 illustrated in FIG. 9B is specified.

Then, the safety rule adjustment unit 5310 adds an exclusion condition to the corresponding record as illustrated in FIG. 9B. As the exclusion condition, the safety rule adjustment unit 5310 specifies and records a condition in the behavior that has caused the safety rule adjustment. In the control, the interdiction condition and the exclusion condition are desirably treated as AND conditions.

In this way, in the present embodiment, when a conflict occurs in the behavior of the control target, the adjustment is performed in the order of the behavior adjustment, the behavior plan adjustment, and the safety rule adjustment.

However, after the behavior adjustment, the behavior plan adjustment may be omitted and the safety rule adjustment may be performed.

Furthermore, in the present embodiment, the startup control unit 5340 is configured to start up the safety rule adjustment unit 5310, the behavior plan adjustment unit 5320, and the behavior adjustment unit 5330, but the startup control unit 5340 may be omitted. Furthermore, the startup control unit 5340 may be configured to start up at least one of the safety rule adjustment unit 5310, the behavior plan adjustment unit 5320, and the behavior adjustment unit 5330. In this case, it is desirable that the startup control unit 5340 starts up the safety rule adjustment unit 5310 and the behavior plan adjustment unit 5320, and the behavior adjustment unit 5330 operates regularly. Note that, in FIG. 8, step S10 is followed by END; however, in the case of the real-time reflection, it is desirable that the processing returns to step S01 as in steps S03, S06, and S09.

Second Embodiment

Figure 10:
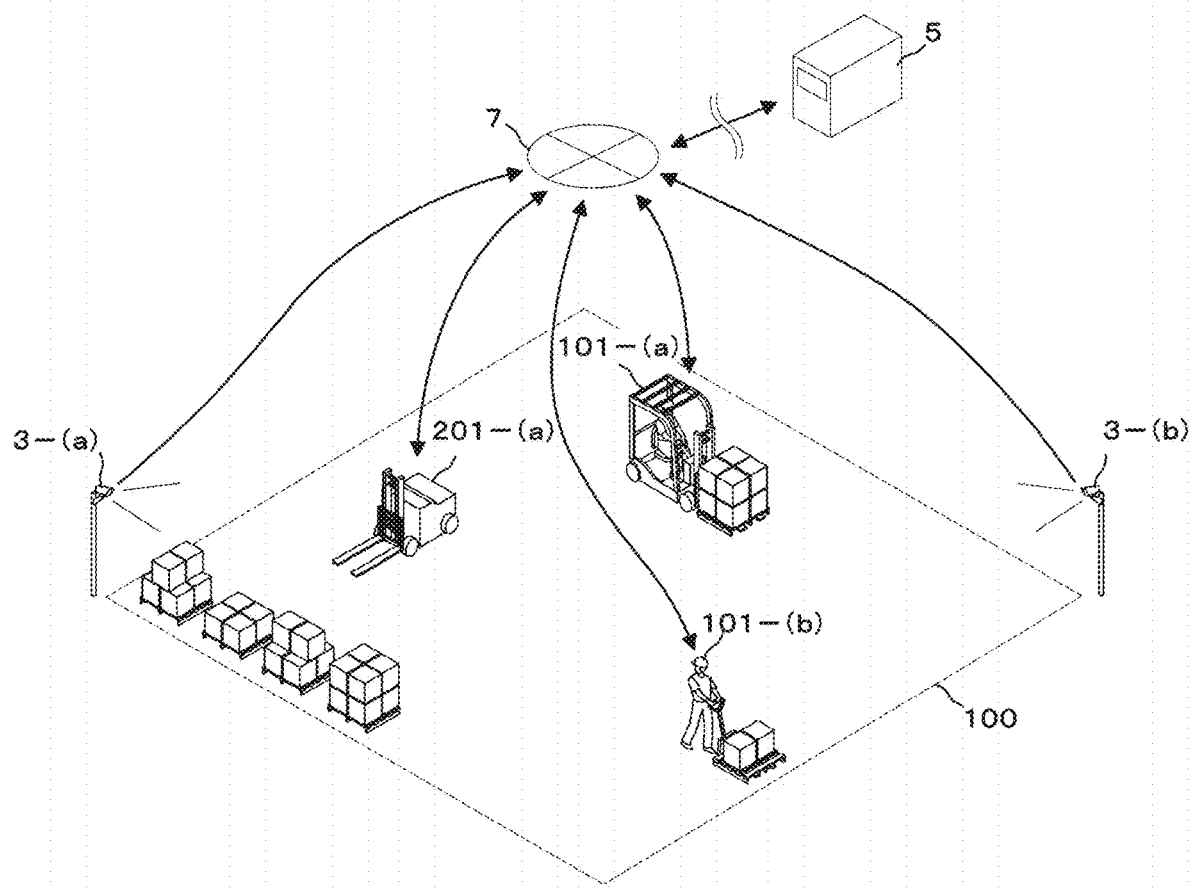
FIG. 10 is a birds-eye view illustrating an automated warehouse system to which a second embodiment is applied.

Next, a second embodiment of the present invention will be described. FIG. 10 is a birds-eye view illustrating an automated warehouse system to which the present embodiment is applied. FIG. 10 illustrates that, in a shared area 100 which is a control area, a cargo of a truck is carried to a temporary storage place on the left side in the drawing, and these are inspected and conveyed to a warehouse which is not illustrated. Therefore, in the shared area 100, disparate systems including a truck loading/unloading system that unmannedly unloads the cargo from the truck and moves the cargo to the temporary storage place, and a warehouse management system that transports the cargo to the warehouse exit mixedly.

Here, the truck loading/unloading system includes an unmanned machine 201-(a) represented by an automatic forklift as a constituent element. In addition, the warehouse management system includes a manned machine 101-(a) represented by a forklift, and a worker 101-(b) as constituent elements. In the shared area 100, the infrastructure sensor devices 3-(a) and 3-(b) are installed. In addition, the safety control server 5 is connected to each of these constituent elements via the network 7.

Then, the safety control server 5 executes the processing described in the first embodiment in the automated warehouse system of the present embodiment. Note that the manned machine 101-(a) and the worker 101-(b) correspond to the mobile bodies 1-(a) and 1-(b) of the first embodiment. Further, the unmanned machine 201-(a) corresponds to the mobile body 2.

Third Embodiment

Figure 11:
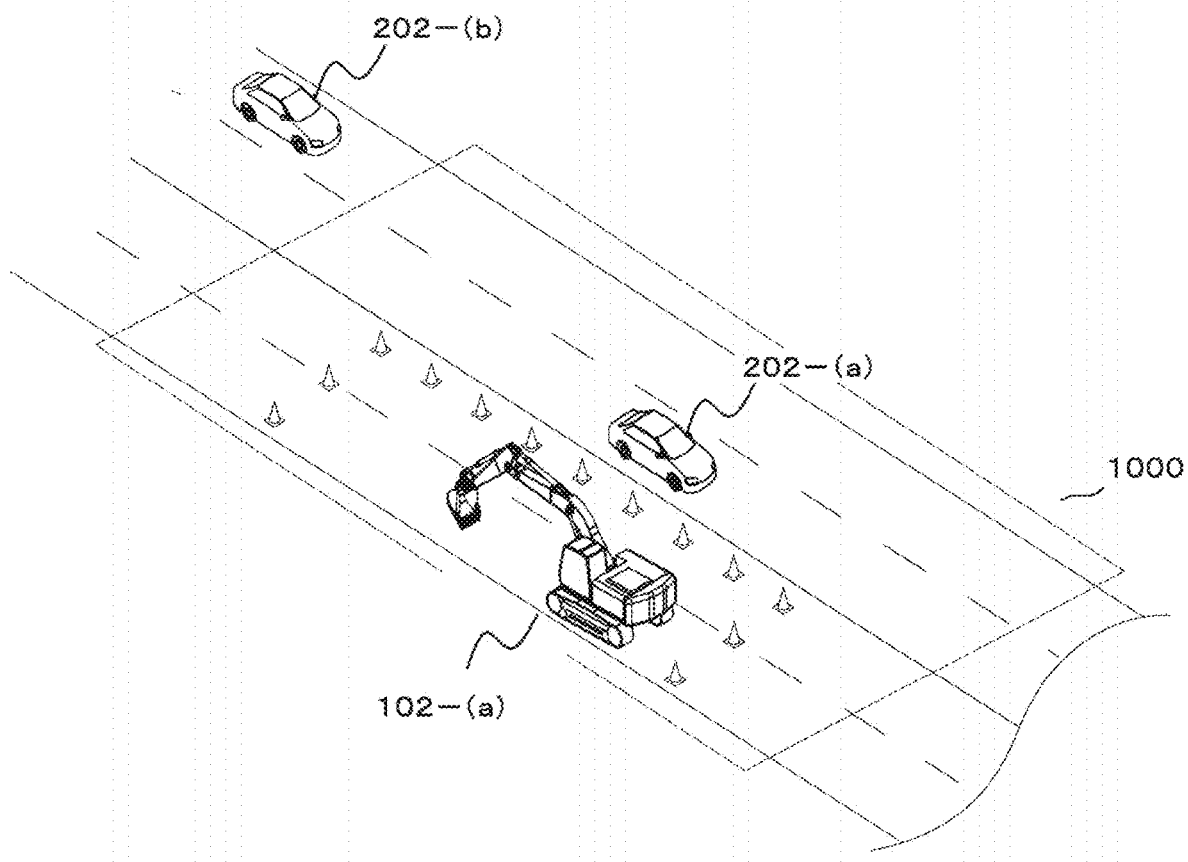
FIG. 11 is a birds-eye view illustrating a construction site 1000 to which a third embodiment is applied.

Next, a third embodiment of the present invention will be described. In the present embodiment, the present invention is applied to a scene where construction is performed by a construction machine on a part of a road on which an automobile travels. The processing of the present embodiment is similar to that of the first embodiment and the second embodiment, but the application is different. FIG. 11 is a birds-eye view illustrating a construction site 1000 to which the present embodiment is applied. In FIG. 11, construction using the construction machine is performed at the construction site 1000 on the road which is a control area. That is, construction is performed by the construction machine and the surrounding workers so as to block one side of the road having two lanes on one side.

Here, a group of automobiles (202-(a), 202-(b)) driven by a person is traveling on a road. These are defined as an automobile driving system which is one control system. The automobile driving system can be comprehended so as to behave according to the traffic rule defined for the place (road, parking lot, etc.) as a base rule. Each of the automobiles 202-(a) and 202-(b) in the automobile system is connected to the safety control server 5 which is not illustrated. Then, it is assumed that a global travel route is distributed from the safety control server 5 to the mobile body controller 11 of each of the automobiles 202-(a) and 202-(b), and automatic driving or manual driving by the operator is performed in the corresponding automobile.

In addition, it is assumed that the construction machine 102-(a) operated by the operator is a construction machine system that is a control system different from the automobile system. The construction machine 102-(a) performs construction such as excavation while sequentially traveling according to a construction plan, and a rule related to the construction plan or work safety in the site serves as the base rule. As described above, disparate systems exist mixedly at the construction site 1000.

Then, the travel routes of the respective mobile bodies (a group of automobiles of an automobile system, and in the case of the construction machine system, the construction machine 102-(a) and the worker) in the independent system based on the base rules of the respective systems are as illustrated in (a) and (b) in FIG. 12. Note that, in FIG. 12, a travel route for lane change in the automobile system is omitted.

Here, when the automobile system and the construction machine system coexist and act in the construction site 1000 which is the shared area, each automobile (202-(a), 202-(b)) cannot travel in the two lanes on one side, due to the construction machine system. Therefore, when there is an automobile traveling in the opposite lane, each automobile (202-(a), 202-(b)) traveling in the lane blocked by the construction machine system continues to stop. Then, when there is no automobile traveling in the opposite lane anymore, the construction machine 102-(a) is overtaken through use of the opposite lane. In addition, in a case where traffic volumes of both lanes are approximately the same, it is highly likely that a traffic jam occurs on one side and a task completion time in the automobile system is extended. Note that the task completion refers to behavior of an automobile, that is, traveling to a destination.

In such an environment, the safety control server 5 performs the processing described in detail in the first embodiment, thereby creating a common travel route as illustrated in (c) in FIG. 12 as the safety rule 61. In the present embodiment, each automobile (202-(a), 202-(b)) is subjected to autonomous control, or guidance is displayed on an in-vehicle device, so that safety and efficiency in the construction site 1000 are optimized.

Fourth Embodiment

Next, a fourth embodiment of the present invention will be described with reference to FIGS. 13A to 13B. The fourth embodiment is an example in which the processing described in detail in the first embodiment is applied to an intersection on the road as the control area. In the present embodiment, it is assumed that the pedestrians 103-(a) and 103-(b) and the automobiles 203-(a) and 203-(b) are approaching the intersection where signals (203-(c), 203-(d)) are installed. Note the pedestrians 103-(a) and 103-(b) include a bicycle and a light road vehicle.

Here, the pedestrians 103-(*a*) and 103-(*b*) correspond to the mobile body 1 of the first embodiment.

In addition, the automobiles 203-(*a*) and 203-(*b*) and the signals 203-(*c*) and 203-(*d*) correspond to the mobile body 2 of the first embodiment. That is, it is assumed that the automobiles 203-(*a*) and 203-(*b*) and the signals 203-(*c*) and 203-(*d*) are under the control system of the safety control server 5. Then, the infrastructure sensor device 3 monitors the field including the intersection, and notifies the safety control server 5 of the object information indicating the content thereof. In addition, the signals 203-(*c*) and 203-(*d*) are examples of the traffic control device, and communicate with the safety control server 5 to control the display thereof. Furthermore, the automobiles 203-(*a*) and 203-(*b*) and the signals 203-(*c*) and 203-(*d*) communicate with the safety control server 5 via the communication device.

Figure 13A:
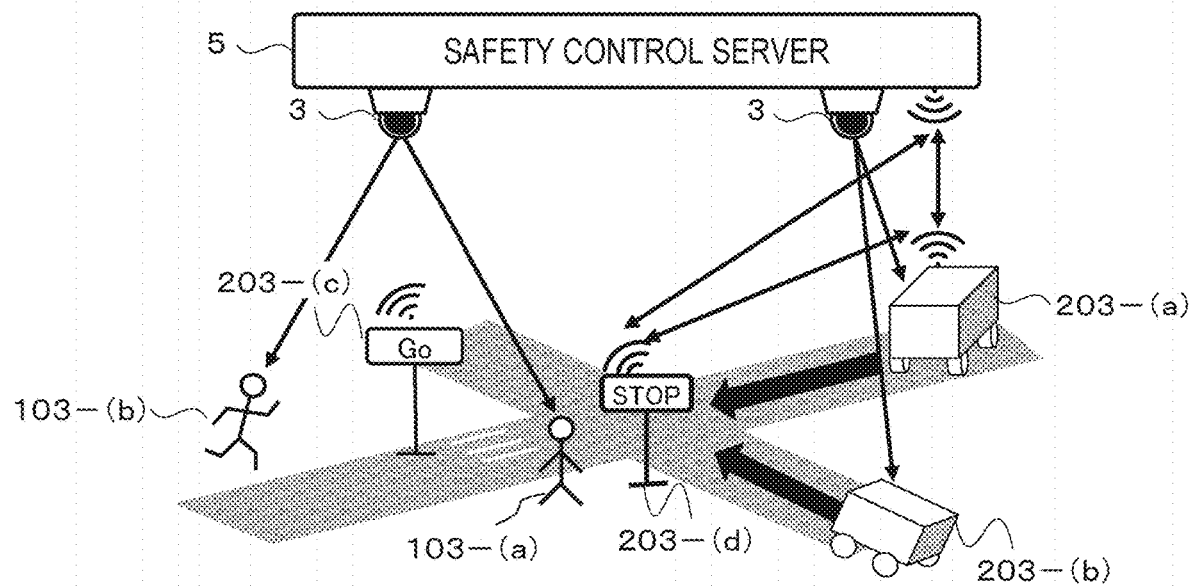
FIG. 13A is a diagram for explaining an example of preventing machine-to-machine and machine-to-human collisions in a fourth embodiment.

First, FIG. 13A is an example of preventing accidents of the pedestrians 103-(*a*), 103-(*b*) and the automobiles 203-(*a*), 203-(*b*), that is, an example of preventing machine-to-machine and machine-to-human collisions. Here, it is assumed that the infrastructure sensor device 3 detects that pedestrians 103-(*a*),103-(*b*) are going to enter the intersection. In this case, the safety control server 5 outputs the behavior adjustment instruction to the automobiles 203-(*a*), 203-(*b*) and the signals 203-(*c*), 203-(*d*). That is, the safety control server 5 outputs the braking instruction to the automobiles 203-(*a*) and 203-(*b*). In addition, the safety control server 5 outputs an instruction for outputting a red light to a signal for automobiles among the signals 203-(*c*) and 203-(*d*). Here, in a case where only a machine-to-human relationship is taken into consideration, the above control causes no problem, but there may be a case where automobiles moving in different directions are respectively stopped.

Therefore, in the present embodiment, the safety control server 5 specifies the entry direction of the pedestrians 103-(*a*), 103-(*b*) into the intersection. Then, the safety control server 5 adjusts behavior of a traffic light for an automobile, which is highly likely to cause an accident in the specified entry direction, to a red light.

Then, the safety control server 5 performs the behavior adjustment described above, and executes the behavior plan adjustment and the safety rule adjustment in a case where a predetermined condition is satisfied. Note that, in the behavior plan adjustment and the safety rule adjustment, it is desirable to execute these adjustments while maintaining the fundamental principle of prioritizing the pedestrians.

Figure 13B:
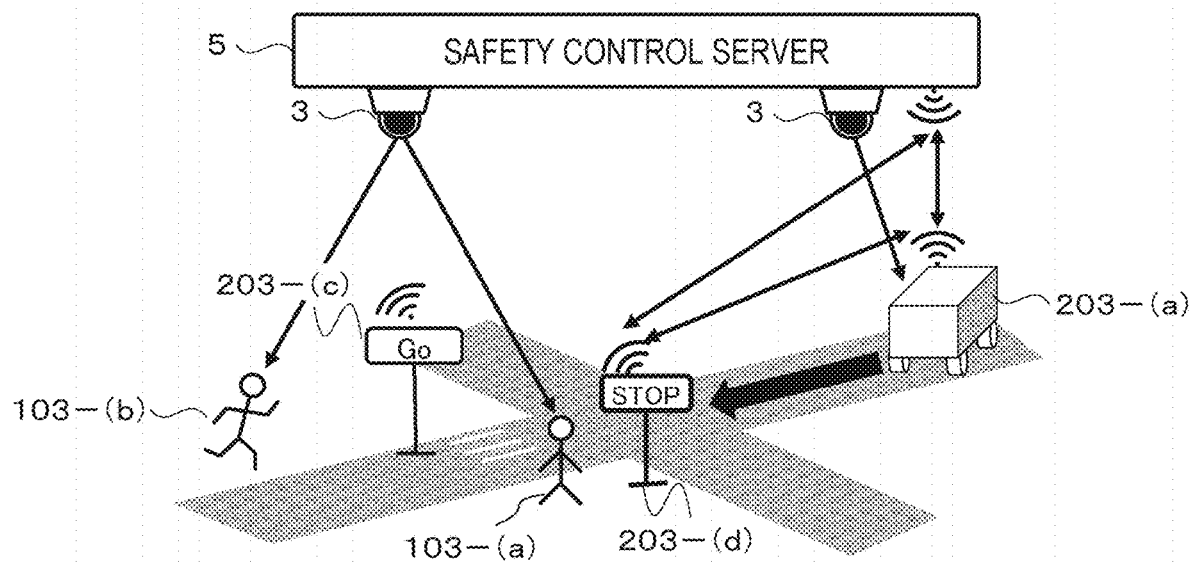
FIG. 13B is a diagram for explaining an example of preventing a machine-to-human collision in the fourth embodiment.

Next, FIG. 13B is a diagram illustrating an example for preventing a machine-to-human collision in the present embodiment, that is, an accident between the automobile 203-(*a*) and the pedestrians 103-(*a*), 103-(*b*). In this example, the behavior adjustment prioritizing the pedestrians 103-(*a*), 103-(*b*) described in FIG. 13A and the subsequent behavior plan adjustment and safety rule adjustment are to be executed.

Figure 13C:
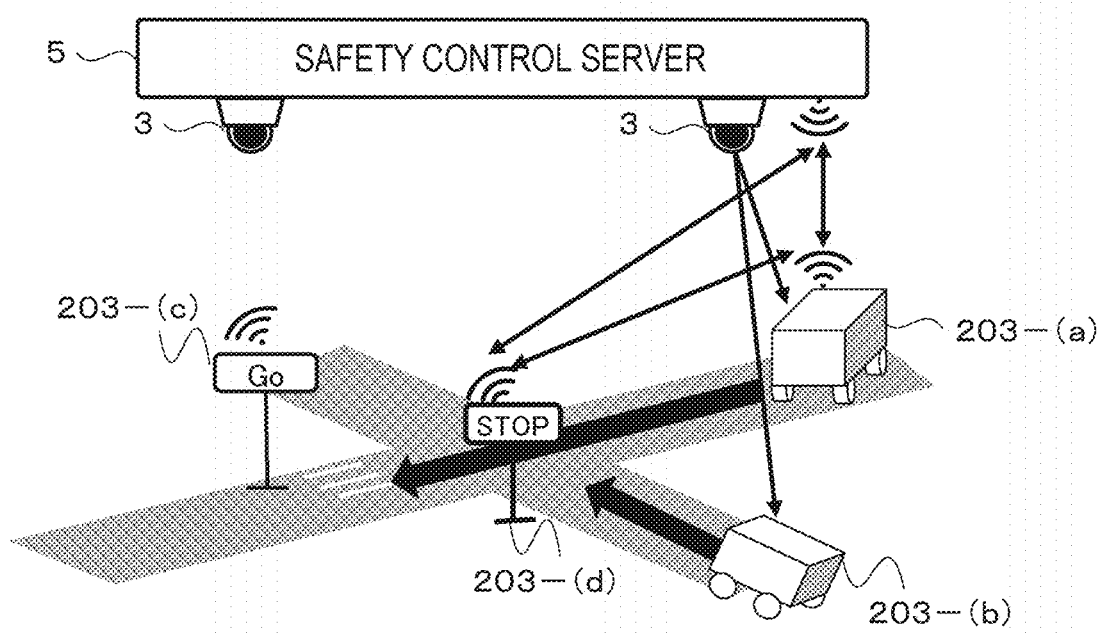
FIG. 13C is a diagram for explaining an example of preventing a machine-to-machine collision in the fourth embodiment.

Finally, FIG. 13C is a diagram illustrating an example for preventing a machine-to-machine collision in the present embodiment, that is, an accident between the automobile 203-(*a*) and the automobile 203-(*b*). When the vehicle on the red light side exceeds the speed limit and it is difficult to stop in front of the intersection, the safety control server 5 performs behavior adjustment. That is, the green light and the red light of the signal are switched as the behavior adjustment. Then, in a case where the behavior adjustment satisfies a predetermined condition, the safety control server 5 executes the behavior plan adjustment and the safety rule adjustment including changing the signal switching interval.

Furthermore, in the present example, in the behavior adjustment and the subsequent plan adjustment and safety rule adjustment of the present example, the behavior adjustment of switching the traffic light may be performed in a case where traffic congestion occurs on the road on the red light side and the traffic volume on the green light side is smaller. Then, the safety control server 5 executes the subsequent plan adjustment and safety rule adjustment. In this case, the behavior plan adjustment and the safety rule adjustment include changing the signal switching interval. In addition, the change of the switching interval includes chancing the switching interval depending on the time of day.

Fifth Embodiment

Figure 14:
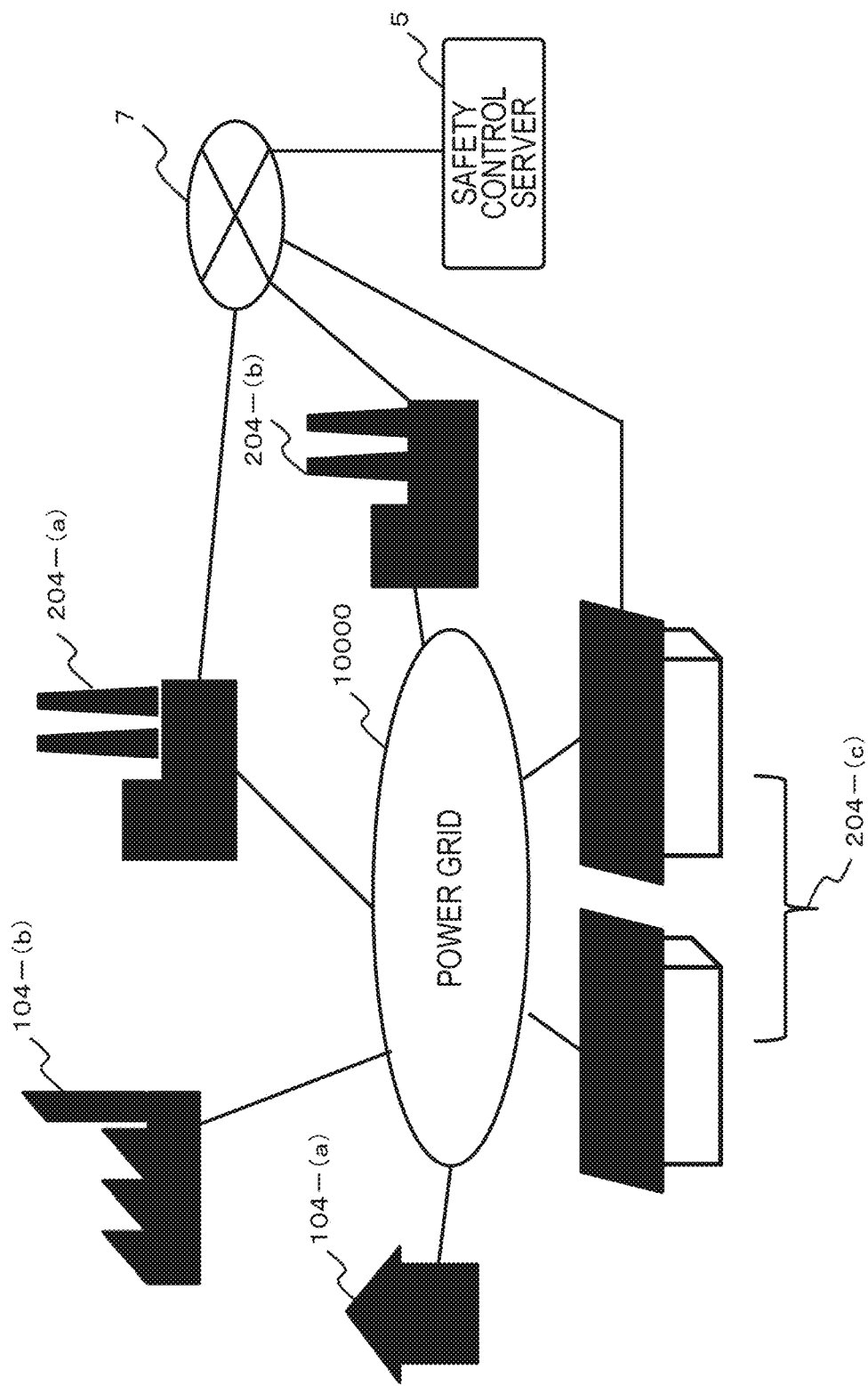
FIG. 14 is a diagram illustrating a power grid to which a fifth embodiment is applied.

Next, a fifth embodiment, which is another example to which the present invention is applied, will be described with reference to FIG. 14. The fifth embodiment is an example in which the processing of the first embodiment is applied to the power grid 10000 as the control area. FIG. 14 illustrates the power grid 10000 of the fifth embodiment. In FIG. 14, consumers 104-(*a*), 104-(*b*) such as general households, business operators, and factories are connected to the power grid 10000. In addition, power plants 204-(*a*), 204-(*b*) and a so-called distributed power supply 204-(*c*) are also connected to the power grid 10000. Then, the safety control server 5 and control devices of the power plants 204-(*a*), 204-(*b*) and the distributed power supply 204-(*c*) are connected via the network 7. Note that smart meters of the consumers 104-(*a*), 104-(*b*) may be connected to the network 7.

Furthermore, devices corresponding to the safety control server 5 may be provided in each of the consumers 104-(*a*), 104-(*b*), the power plants 204-(*a*), 204-(*b*), and the distributed power supply 204-(*c*). In the present embodiment, the consumers 104-(*a*), 104-(*b*) correspond to the mobile body 1 of the first embodiment. In addition, the power plants 204-(*a*), 204-(*b*) and the distributed power supply 204-(*c*) correspond to the mobile body 2 of the first embodiment. As described above, in the present embodiment, the system on the power supply side (control system) and the system on the demand side (control system) exist mixedly. In this case, the behavior adjustment, the behavior plan adjustment, and the safety rule adjustment to be described later are executed for the supply-side or demand-side system. However, each power plant or factory may be regarded as one system. These systems may be targeted by the behavior adjustment, the behavior plan adjustment, and the safety rule adjustment to be described later.

Here, in the power grid 10000, a power shortage (including a power failure) or a power surplus occurs as a conflict. Therefore, when such a conflict occurs, the safety control server 5 outputs a command regarding power control, that is, a behavior adjustment command to the power plants 204-(*a*), 204-(*b*) and the distributed power supply 204-(*c*). As a result, the power generation amount in the power plants 204-(*a*), 204-(*b*) and the distributed power supply 204-(*c*) is controlled. When the behavior adjustment indicated by this control satisfies a predetermined condition, the safety control server 5 executes the behavior plan adjustment and the safety rule adjustment. The behavior plan adjustment and the safety rule adjustment include creation and correction of a power generation schedule.

Note that, in the present embodiment, the power generation amount of the power plant or the power supply is controlled as the behavior adjustment, but the operation in the substation or the like may be controlled. Furthermore, the safety control server 5 may control a smart meter installed on the consumer side to execute control of the demand as the behavior adjustment.

The description of the embodiments of the present invention is thus completed. The present invention is not limited to the above-described examples, and can be applied to other applications where a conflict occurs.

REFERENCE SIGNS LIST

1 mobile body 1
11 mobile body controller
11-1 sensor processing unit
12 mobile body sensor
2 mobile body 2
21 on-board controller
21-1 sensor processing unit
21-2 behavior plan control unit
21-3 behavior control unit
22 mobile body sensor
23 mobile body actuator
3 infrastructure sensor device
31 infrastructure sensor controller
31-1 sensor processing unit
32 infrastructure sensor
5 safety control server
5310 safety rule adjustment unit
5320 behavior plan adjustment unit
5330 behavior adjustment unit
5340 startup control unit
5350 control area monitoring unit
6 safety rule DB

The invention claimed is:

1. A safety control device for controlling behavior of each control target in disparate systems under a plurality of control systems, the safety control device comprising:
 a behavior adjustment unit which, in a case where a conflict deviating from a control result in which behavior of a control target is assumed occurs, outputs a behavior adjustment instruction for adjusting behavior to the control target, the control target being among control targets of different types of control systemization;
 a behavior plan adjustment unit which, in a case where the adjustment of the behavior satisfies a predetermined condition, adjusts a behavior plan indicating a behavior regulation for avoiding a conflict and exerting a function in the control target stored in advance; and
 a safety rule adjustment unit which, in a case where the adjustment of the behavior plan satisfies a predetermined condition, adjusts a safety rule indicating a behavior regulation stored in advance for avoiding a conflict in the control target.

2. The safety control device according to claim 1, wherein the behavior plan adjustment unit executes the adjustment of a behavior plan by either:
 lowering a priority of the behavior plan corresponding to behavior that has caused the adjustment of the behavior; or
 adding an exclusive condition to a behavior starting condition indicated by the behavior plan corresponding to behavior that has caused the adjustment of the behavior.

3. The safety control device according to claim 1, wherein
 in the safety rule, behavior of the control target and an interdiction condition thereof are associated with each other, and
 the safety rule adjustment unit executes the adjustment of the safety rule by adding an additional condition, which is an OR condition, to the interdiction condition corresponding to behavior that has caused the adjustment of the behavior plan.

4. The safety control device according to claim 1, wherein
 in the safety rule, behavior of the control target and a permission condition thereof are associated with each other, and
 the safety rule adjustment unit executes the adjustment of the safety rule by adding an exclusion condition, which is an AND condition, to the permission condition corresponding to behavior that has caused the adjustment of the behavior plan.

5. A safety rule adjustment method using a safety control device for controlling behavior of each control target in disparate systems under a plurality of control systems, the method comprising:
 by a behavior adjustment unit, in a case where a conflict deviating from a control result in which behavior of a control target is assumed occurs, outputting a behavior adjustment instruction for adjusting behavior to the control target, the control target being among control targets of different types of control systemization;
 by a behavior plan adjustment unit, in a case where the adjustment of the behavior satisfies a predetermined condition, adjusting a behavior plan indicating a behavior regulation for avoiding a conflict and exerting a function in the control target stored in advance; and
 by a safety rule adjustment unit, in a case where the adjustment of the behavior plan satisfies a predetermined condition, adjusting a safety rule indicating a behavior regulation stored in advance for avoiding a conflict in the control target.

6. The safety rule adjustment method according to claim 5, wherein, by the behavior plan adjustment unit, the adjustment of a behavior plan is executed by either:
 lowering a priority of the behavior plan corresponding to behavior that has caused the adjustment of the behavior; or
 adding an exclusive condition to a behavior starting condition indicated by the behavior plan corresponding to behavior that has caused the adjustment of the behavior.

7. The safety rule adjustment method according to claim 5, wherein
 in the safety rule, behavior of the control target and an interdiction condition thereof are associated with each other, and
 by the safety rule adjustment unit, the adjustment of the safety rule is executed by adding an additional condition, which is an OR condition, to the interdiction condition corresponding to behavior that has caused the adjustment of the behavior plan.

8. The safety rule adjustment method according to claim 5, wherein
 in the safety rule, behavior of the control target and a permission condition thereof are associated with each other, and by the safety rule adjustment unit, the adjustment of the safety rule is executed by adding an exclusion condition, which is an AND condition, to the permission condition corresponding to behavior that has caused the adjustment of the behavior plan.

* * * * *